United States Patent
Navalon Carretero

(10) Patent No.: US 6,831,441 B1
(45) Date of Patent: Dec. 14, 2004

(54) SPEED REGULATOR BY PULSE WIDTH MODULATION FOR DIRECT CURRENT MOTORS

(75) Inventor: Herminio Navalon Carretero, Motilla del Palancar (ES)

(73) Assignee: Nagares, S.A., Motilla del Palancar (ES)

( * ) Notice: Subject to any disclaimer, the term of this patent is extended or adjusted under 35 U.S.C. 154(b) by 0 days.

(21) Appl. No.: 09/958,691

(22) PCT Filed: Apr. 15, 1999

(86) PCT No.: PCT/ES99/00097
§ 371 (c)(1),
(2), (4) Date: Jan. 11, 2002

(87) PCT Pub. No.: WO00/64040
PCT Pub. Date: Oct. 26, 2000

(51) Int. Cl.[7] ............... H02P 5/34; H02P 7/42
(52) U.S. Cl. ............ 318/800; 318/254; 318/432; 318/434; 318/799; 388/804; 388/805
(58) Field of Search ............... 318/799, 254, 318/432, 434, 599, 800, 696; 388/804, 805

(56) References Cited

U.S. PATENT DOCUMENTS

| | | | | |
|---|---|---|---|---|
| 4,465,961 A | * | 8/1984 | Landino | ............ 318/811 |
| 5,270,631 A | * | 12/1993 | Takahashi | ............ 318/135 |
| 5,309,077 A | | 5/1994 | Choi | |
| 5,625,269 A | * | 4/1997 | Ikeda | ............ 318/696 |
| 5,811,948 A | | 9/1998 | Sato et al. | |

FOREIGN PATENT DOCUMENTS

| | | |
|---|---|---|
| DE | 195 48 270 A1 | 6/1997 |
| DE | 196 17 947 C1 | 7/1997 |
| EP | 0 655 835 A1 | 5/1995 |
| EP | 763 883 A3 | 3/1997 |
| EP | 823 775 A2 | 2/1998 |

* cited by examiner

Primary Examiner—Michael Sherry
Assistant Examiner—Tyrone W. Smith
(74) Attorney, Agent, or Firm—Welsh & Katz, Ltd.

(57) ABSTRACT

Disclosed is an electronic pulse width modulation (PWM) regulator of a low frequency rectangular wave signal serving to control the speed of a direct current motor. The invention aims at simplifying the design of said regulator by eliminating the classical inductive element so that the motor continuously operates as a filter of the output signal provided by the switching component. The invention also aims at preventing noises caused by switching. To this end, subsonic switching frequencies of less than 50 Hz are used.

3 Claims, 1 Drawing Sheet

SPEED REGULATOR BY PULSE WIDTH MODULATION FOR DIRECT CURRENT MOTORS

PURPOSE OF THE INVENTION

In this invention an electronic regulator has been developed to control the speed of a direct current electric motor, with which is possible to simplify the design regarding the existing velocity regulators.

Equally, it is the purpose of this invention, to reduce the noise produced by the switching, so that the operation of the motor is as silent as possible, and to obtain an acceptable level of electromagnetic interference.

BACKGROUND TO THE INVENTION

PWM (Pulse Width Modulation) regulators, that are more efficient than lineal regulators, are well known. In the latter the velocity of a direct current motor is controlled by varying the induced current by changing the value of a resistive element (for example a lineal transistor) in series with the motor, and they have the disadvantage of the large losses that take place in this resistive element.

The pulse width modulation regulators (PWM) allow a more effective regulation. These regulators base their operation on a switching device, which might be a power transistor, to which is applied a fixed frequency signal and which is made to always work in one of two states: conduction or non conduction. To vary the current or the output voltage, it modifies the width of the pulse that determines the conduction time of the switching unit. After the switching stage a filter should be placed to eliminate in the amount necessary the current and/or voltage fluctuations caused by the switching.

The use of the PWM regulators has not been introduced definitively in the automobile sector, since it is a solution that implies a high economic cost. The purpose of this invention is to present a product suitable for this and other markets, in which the cost is a key factor.

German patent DE-196.17.947 discloses a power supply circuit for motor minimising mains network reaction. The circuit comprises a rectifier, a controlled switch and a set-point potentiometer. The motor has a free-wheeling diode in parallel with its armature and other stator winding. A further stator winding fulfils the role of a smoothing choke in conjunction with a capacitor.

In this circuit arrangement, the independent use of several stator windings is required for that a modified motor is needed.

The European patent EP-655.835 reveals a method and device for controlling an electric apparatus by means of a pulse width modulation device, in which the electric apparatus is switched on and off at a low cyclic rate within the range of 20 Hz to 10 Khz and wherein each low-frecuency cycle signal (a) is followed by a number of high-frecuency signals (b) in a range of 10 Khz to 100 Khz which delays the current drop.

In this method, interfering low-frecuency noise is prevented due to the sinusoidal current drop af the end of the low-frecuency cycle signal.

DESCRIPTION OF THE INVENTION

The velocity regulator for direct current motors in which this invention consists, presents a simplified design with which the costs are decreased considerably, at the same time that the noises caused by the switching of the motor are reduced, making the switching as smooth as possible.

Thus, the invention consists in that the regulator does not require any inductor element to filter the output of the switching device, since the winding of the motor and its own mechanical inertia function as a filter, with which a significant economic saving is made on eliminating this inductive element.

The key to be able to eliminate the usual inductor in the PWM circuits and to substitute it by the same motor consists in using a switching frequency below audible limit, that is to say below 50 Hz, and to switch smoothly. But since direct current motors act as sound transducers, the switching frequency can be heard if it is in the audible range. In the case of a subsonic modulation frequency, what is heard are the transitions, those alterations that contain audible frequencies. To reduce this effect curving the form of the direct wave has been resorted to, eliminating the usual abrupt transitions in the PWM circuits.

The inductor being eliminated from the PWM circuit, allows this latter to be integrated completely in a semiconductor capsule, something impossible in any other way (the inductor cannot be integrated).

An additional consequence of using smooth switching is that, in many cases, you can do without, as well as the inductor, also the flyback diode usually associated with every PWM circuit. This entails a very important additional cost reduction and the possibility that the circuit may support an inversion of the supply voltage without being destroyed.

DESCRIPTION OF THE DRAWINGS

To complete the description that is being carried out and with aim of helping to a better understanding of the characteristics of the invention, this descriptive report is accompanied, as an integral part of the same, by a group of drawings where in an illustrative and non- limiting way, the following has been represented.

PREFERABLE REALIZATION OF THE INVENTION

Figure 1:
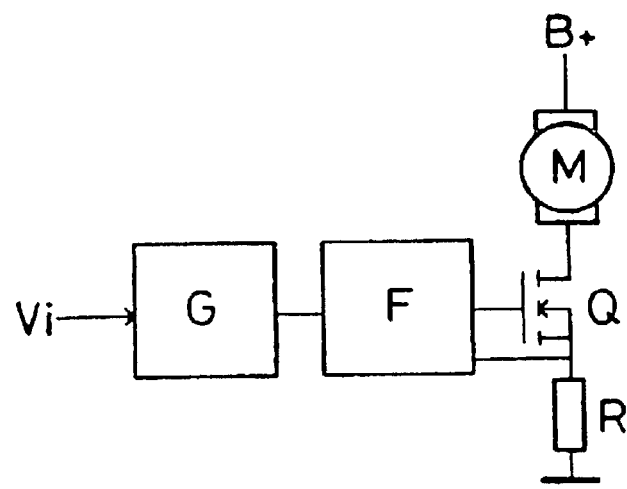
FIG. 1, represents schematically the velocity regulator, purpose of this invention.
Figure 2:
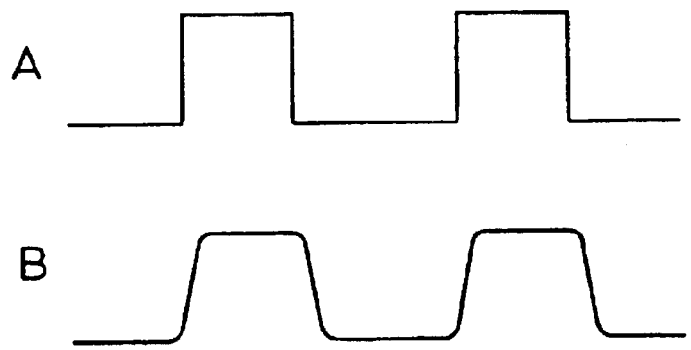
FIG. 2, represents the original modulation signal in the upper wave, and the modulation signal that is applied to the switching apparatus, suitably rounded, in the lower wave.
Figure 3:
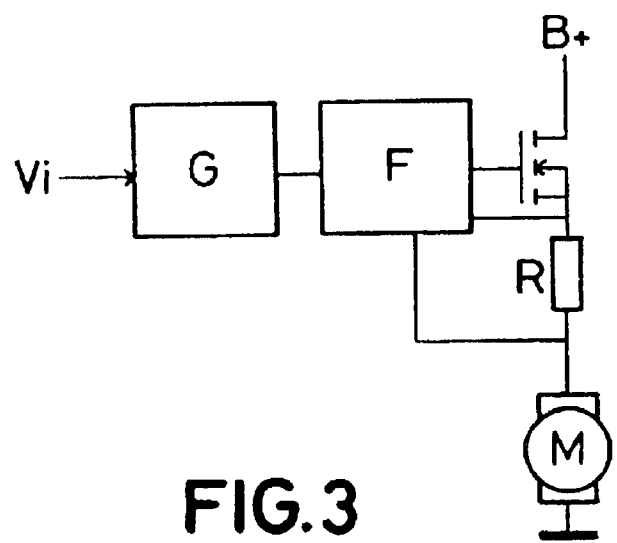
In FIG. 3 an alternative execution is presented to that of FIG. 1, this time with the motor on the earth side. In the two FIGS. 1 and 3 the operation is the same.

In the FIG. 1 a representation of the velocity regulator is seen, in which no inductive unit is used to filter the output signal, since it has been achieved that the same direct current motor (M) functions as a filter element damping the signal, thus this way obtaining a remarkable simplicity in the design and a significant economic saving, since the inductive unit is a component that notably increases the cost of the product.

The switching unit in this practical realization is a transistor (Q) "mosfet" type whose switching is governed by means of the control variable (Vi) that is a direct voltage and that according to its value determines the width of the pulse signal (A) that is provided by the generator of the rectangular wave (G). This rectangular signal (A) can also optionally be generated directly by a micro-controller.

This signal (A) is of fixed frequency and variable pulse width, and passes through the filter (F) that curves it and slants the rising and falling edges to ensure that the step from conduction to cut-off and vice versa, of the transistor (Q) is smooth. The filter (F) thus eliminates the high frequency components in this signal (A). The filter, together with the transistor Q and the current sensor, act on the current that goes through the motor and ensures smooth transitions. For that the value of this current needs to be known at every moment, which is achieved by means of a shunt resistance R or by any other type of system of current sensing. In the figure a shunt resistance has been drawn, for simplicity, not being the only method possible of sensing of current.

Controlling the time duration of conduction and cut out of the transistor (Q), the velocity of the motor (M) is regulated, that is supplied by means of the direct voltage (B+).

The frequency of the signal (A) generated by (G) is fixed and has a value less than 50 Hz, so that the switching frequency is in the subsonic range, that is to say that it is not audible, since in the case of being above this frequency it would be audible because the direct current motors act as sound transducers.

However, in switching at a low subsonic frequency, those switchings that contain frequencies in the audible range are audible, which the filter (F) is in charge of suppressing when curving the signal (A).

What is claimed is:

1. Speed regulator with a direct current motor wherein the regulation is performed by pulse width modulation whose operation is controlled by means of a switching component which is in turn governed by a rectangular wave generator, in which the width of the pulses is modulated by means of a control voltage, characterized in that the winding of the motor itself is used as an inductive element to filter the output signal provided by the switching component, and wherein the frequency of the modulation signal provided by the rectangular wave generator is less than 50 Hz, to provide switching frequencies below 50 Hz, said modulation signal being curved by an active filter connected in series between the rectangular wave generator and the switching component, said active filter controlling the rising and falling edges to smoothen the switching and eliminate the high frequency components.

2. Speed regulator with a direct current motor, according to claim 1, characterized in that the switching component does not use a flyback diode, which allows the switching component to tolerate the inversion of the supply voltage without being destroyed.

3. Speed regulator with a direct current motor, according to claim 1, characterized in that the speed regulator is integrated in a semiconductor capsule.

* * * * *